US011114875B2

(12) United States Patent
  Zhang

(10) Patent No.: US 11,114,875 B2
(45) Date of Patent: Sep. 7, 2021

(54) INTEGRATED CHARGER AND REMOTE CONTROL

(71) Applicant: Kanghong Zhang, Santa Fe Springs, CA (US)

(72) Inventor: Kanghong Zhang, Santa Fe Springs, CA (US)

(*) Notice: Subject to any disclaimer, the term of this patent is extended or adjusted under 35 U.S.C. 154(b) by 229 days.

(21) Appl. No.: 16/409,655

(22) Filed: May 10, 2019

(65) Prior Publication Data

US 2019/0356146 A1  Nov. 21, 2019

Related U.S. Application Data

(60) Provisional application No. 62/774,747, filed on Dec. 3, 2018, provisional application No. 62/672,228, filed on May 16, 2018.

(51) Int. Cl.
  *H02J 50/10* (2016.01)
  *H02J 7/00* (2006.01)
  *H01R 13/17* (2006.01)
  *H02J 7/02* (2016.01)

(52) U.S. Cl.
  CPC ............ *H02J 7/0045* (2013.01); *H01R 13/17* (2013.01); *H02J 7/025* (2013.01); *H02J 50/10* (2016.02)

(58) Field of Classification Search
  CPC .......... H02J 7/0045; H02J 50/10; H02J 7/025; H01R 13/17
  See application file for complete search history.

(56) References Cited

U.S. PATENT DOCUMENTS

| 5,635,814 A | 6/1997 | Afzal | |
|---|---|---|---|
| 5,648,712 A | 7/1997 | Hahn | |
| 2008/0165066 A1* | 7/2008 | Tiscareno | H02J 50/10 343/702 |
| 2010/0271802 A1* | 10/2010 | Recker | H05B 47/19 362/20 |
| 2011/0187323 A1 | 8/2011 | Gourley | |
| 2015/0084589 A1* | 3/2015 | Tsai | H02J 50/10 320/108 |
| 2016/0072327 A1* | 3/2016 | Knutson | G06F 1/1632 320/108 |
| 2016/0079801 A1* | 3/2016 | Zhang | H02J 50/10 320/108 |
| 2019/0296506 A1* | 9/2019 | McQueen | G06T 17/05 |
| 2020/0091755 A1* | 3/2020 | Larsson | H02J 7/0044 |

\* cited by examiner

*Primary Examiner* — Nghia M Doan
(74) *Attorney, Agent, or Firm* — Clement Cheng

(57) ABSTRACT

An integrated charger and remote control has a switch box having an electrical switch. A docking area is formed on the switch box. A remote control faceplate modularly attaches to the docking area and can be selectively released and attached to the docking area. The remote control has a wireless transmitter. Control buttons are formed on the remote control. A magnetic latch retains the remote control faceplate to the docking area. The magnetic latch has two modes, namely a retained mode when the remote control is retained to the docking area, and a released mode when the remote control faceplate is detached from the docking area. The base controls include a base off button, a base on button, base first dimming switch button, and a base second dimming switch button. The remote control covers the base controls when the remote control is latched to the docking area.

14 Claims, 4 Drawing Sheets

INTEGRATED CHARGER AND REMOTE CONTROL

This application claims priority from and is a nonprovisional of provisional application 62/672,228 by same inventor Kanghong Zhang entitled Integrated Charger And Remote Control filed May 16, 2018, the disclosure of which is incorporated herein by reference.

This application also claims priority from and is a nonprovisional of provisional application 62/774,747 by same inventor Kanghong Zhang entitled Wall Mount Charger filed Dec. 3, 2018, the disclosure of which is incorporated herein by reference.

FIELD OF THE INVENTION

The present invention is in the field of remote controls.

DISCUSSION OF RELATED ART

A variety of different Bluetooth, wireless and other protocols have been adopted for lighting solutions where a remote control is provided with the battery. Unfortunately, battery power the case over time. The prior art has a variety of different designs for fixed wireless wall controls with power that are battery free. Unfortunately, all remotes eventually run out of power. When the remote or wall control is failed, the user can control the light during an emergency. Thus, a variety of different devices have been invented for improving charging.

As seen in U.S. Pat. No. 5,648,712 by inventor Stan S. Hahn entitled Universally Interchangeable And Modular Power Supply With Integrated Battery Charger filed Jul. 15, 1997 describes, "An integrated power supply and battery charger with interchangeable and collapsible plug capacity and interchangeable power input modules includes a casing, an electrical plug detachably mounted in the casing and including collapsible prongs, allowing the user to accommodate myriad combinations of power source configurations, electrical devices and rechargeable batteries therefore and to power and charge same in a safe and convenient manner. A cradle accommodates a battery to be charged. Releasable locking mechanisms are included to both engage the interchangeable electrical plug and battery and to lock the collapsible prong in the extended position. The locking mechanisms can be released by a user to allow the plug or battery to be moved to the detached position. A preferred form of electrical connection between a detachable plug and casing comprises a submerged pin and sleeve configuration to protect the user or passerby from electric shock. A preferred form of conducting prong is collapsible within the carrier and is securable in an extended position to avoid inadvertent collapse. A variety of interchangeable electrical plugs can be fitted to the same casing. A power supply is preferably fitted within the casing, allowing an electrical device to be attached to the device while the device is also acting as a battery charger. A collapsible stand is provided to enable the user to easily utilize both the battery charging and power supplying abilities of the inventive device in tandem.", the disclosure of which is incorporated herein by reference.

Also as seen in the U.S. Pat. No. 5,635,814 by inventor Ejaz Afzal entitled Modular Battery System Having A Pluggable Charging Module filed Jun. 3, 1997 describes, "A modular battery system for a portable device including a charging module with a retractable plug and charging circuit for converting an AC line voltage to a DC battery charging current. The charging module combines with a battery module and optional fuel gauge (if present) to form a single unit for recharging, preconditioning the battery, and connection to the portable device. The modules are releasably connected, preferably involving conductive fasteners, so that a user may connect a new battery module to an old charging module. The releasable connection serves as both the mechanical and the electrical interface between the battery module and the charging module. The conductive fasteners may be located in different positions on the modules to accommodate different connector geometries. The charging module may also combine with a battery mounting module, rather than the battery module, so that the system works with conventional battery packs. The preferred charging module incorporates a PWM charging circuit having a transformer with a primary winding, a secondary winding, and a control winding. The control winding has two purposes, it provides feedback information and it provides operating current for the continued operation of the PWM charging circuit. The transformer is designed so that the primary winding has a better magnetic coupling with the secondary winding than with the control winding so that the charging circuit will run in a safe low-power "standby" mode in the event of a short circuit in the secondary circuit. The feedback circuit from the control winding is preferably filtered through a low-pass filter to remove "flyback" transients." The disclosure of which is incorporated herein by reference.

For example, United States patent number US20110187323A1 by inventor James Robert Gourley entitled Mobile Electronic Device AC Charger Mount filed Feb. 19, 2018 describes, "A device for mounting a mobile electronic device to an alternating current charger is provided. The mount allows the user to charge a mobile electronic device with the alternating current charger provided by the original equipment manufacturer of the mobile electronic device. The mount also protects the mobile electronic device from damage." The disclosure of which is incorporated herein by reference.

SUMMARY OF THE INVENTION

The present invention has a main body formed as a wall mounted electrical box. The wall-mounted electrical box is a switch box. The lighting controller uses wireless technology to provide a remote control. The remote control is recharged on a docking surface on the electrical box. The remote control can be hard wired in the switch box or have a battery or capacitor for energy storage. The battery is charged by a charger formed in the docking area. The docking area has controls that may include an on button, an off button, a base first dimming switch button, and a base second dimming switch button. The base controls are covered by the remote control when the remote control is latched to the docking area. In this way, a user can use both the base controls and the remote control.

In the switch box, the power supply that functions as a charger. The charger is connected to AC current. The charger can have physical output contact, or a wireless charging pad. The remote control can be retained to the charger by a magnetic latch.

The remote control can be charged by electrical contact or wireless inductive charging. When installed, the faceplate will hold the remote in location and have an appearance just like a regular switch. A user can have multiple remote controls that interchange to the switch box which acts as a base. Remote controls can support different wireless technologies, such as RF, Bluetooth, Zigbee, Z-wave, and the like.

An integrated charger and remote control has a switch box having an electrical switch. A docking area is formed on the switch box. A remote control faceplate modularly attaches to the docking area and can be selectively released and attached to the docking area. The remote control has a wireless transmitter. Control buttons are formed on the remote control. A latch retains the remote control faceplate to the docking area. The latch has two modes, namely a retained mode when the remote control is retained to the docking area, and a released mode when the remote control faceplate is detached from the docking area.

A battery is located within the remote control. The integrated charger and remote control optionally includes a remote control faceplate that has a pin connector socket with a first data contact, a second data contact, a first power contact and a second power contact, and configured so that the contacts make electrical connection to pins in a docking area. The docking area has a first data pin, a second data pin, a first power pin, and a second power pin. A remote control pin connector base protrudes from a surface of the docking area.

The pin connector socket is recessed into the remote control faceplate. The battery is charged through contacts on the remote control faceplate and can also be charged wirelessly through a pair of inductive loops. Data can also be transmitted wirelessly and through electrical contacts.

Traditionally, remote controls and chargers were separated from wall switch plate units.

Figure 1:
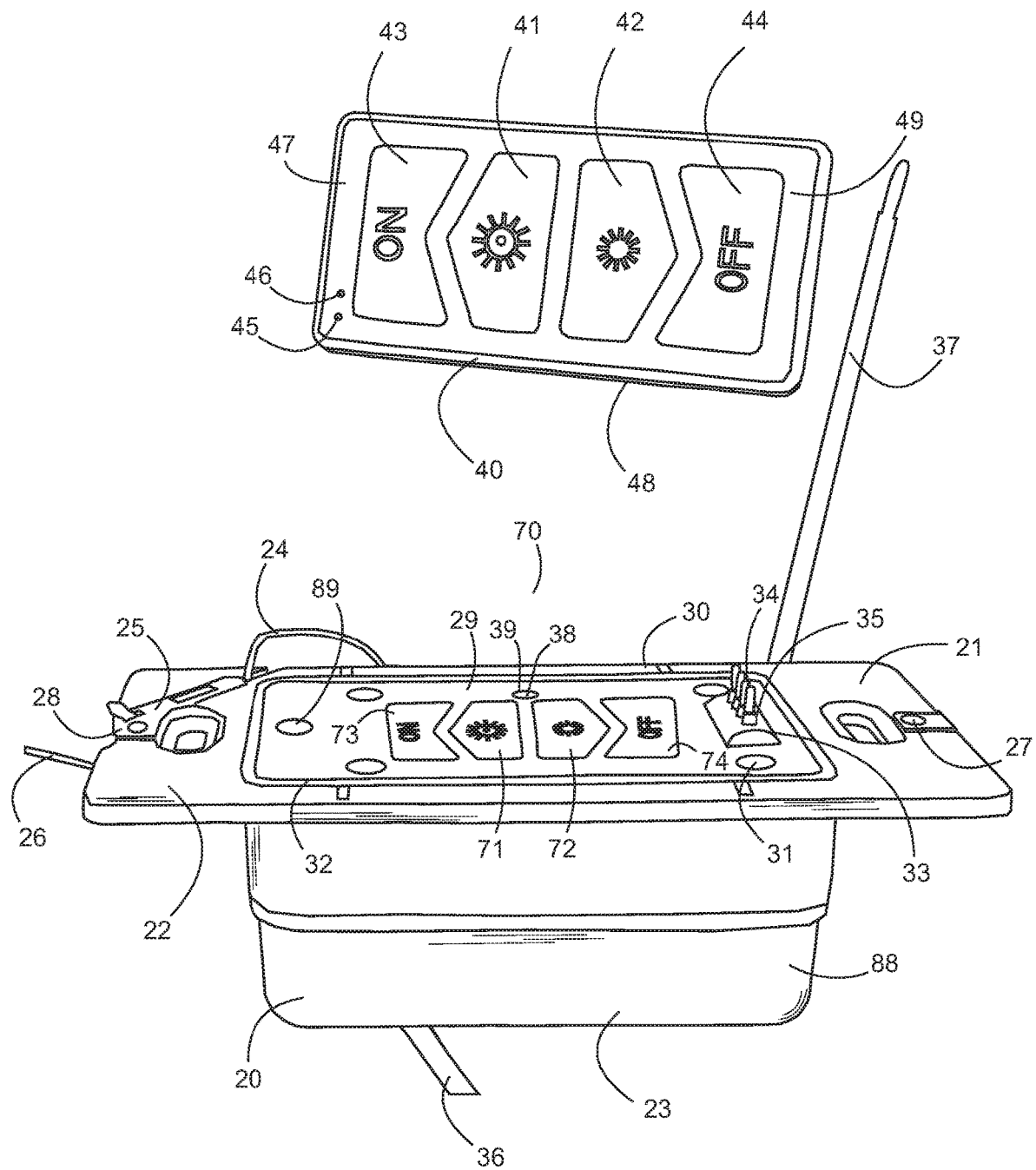
FIG. 1 is a diagram of the present invention.
Figure 2:
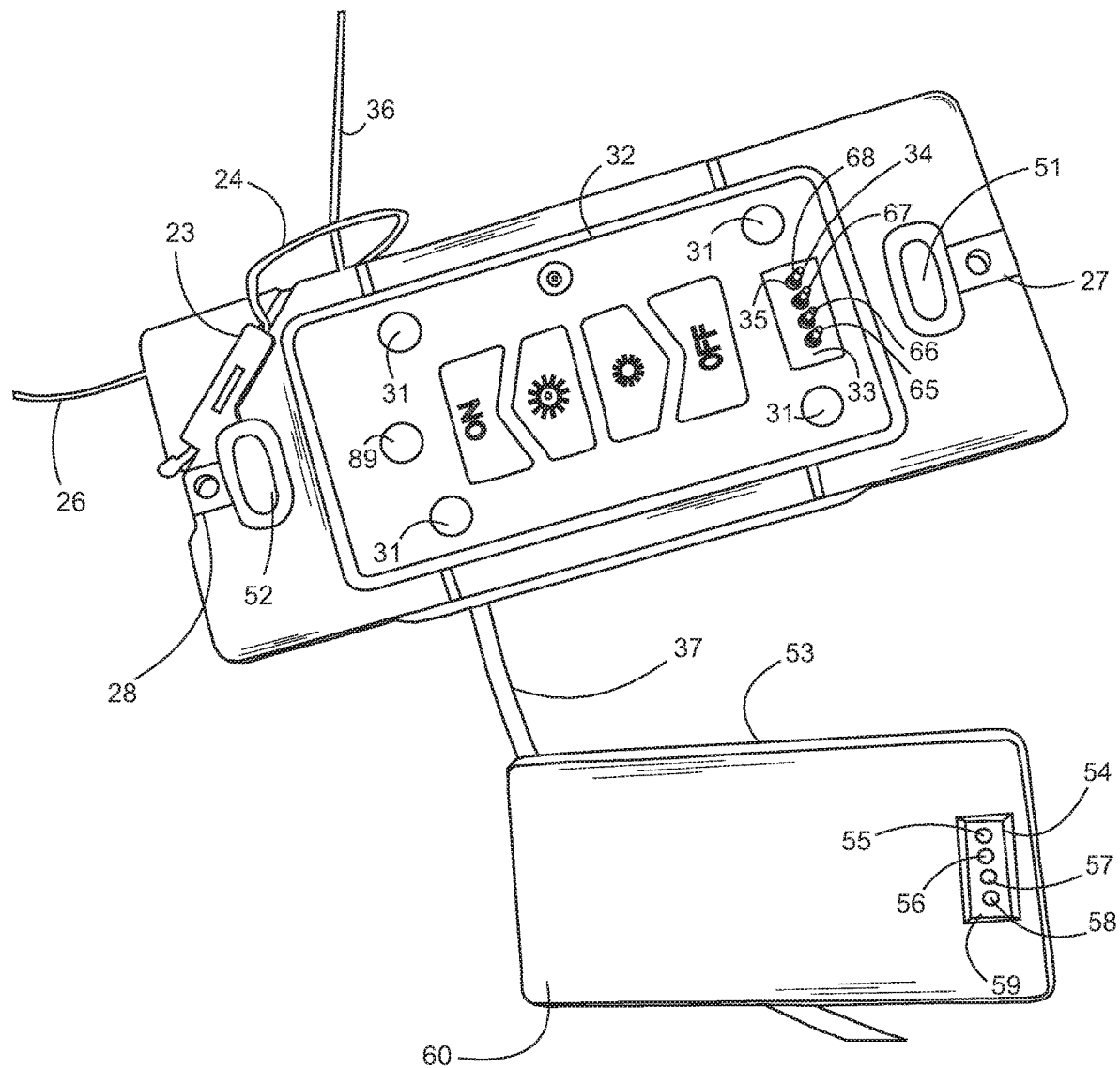
FIG. 2 is a diagram of the present invention.
Figure 3:
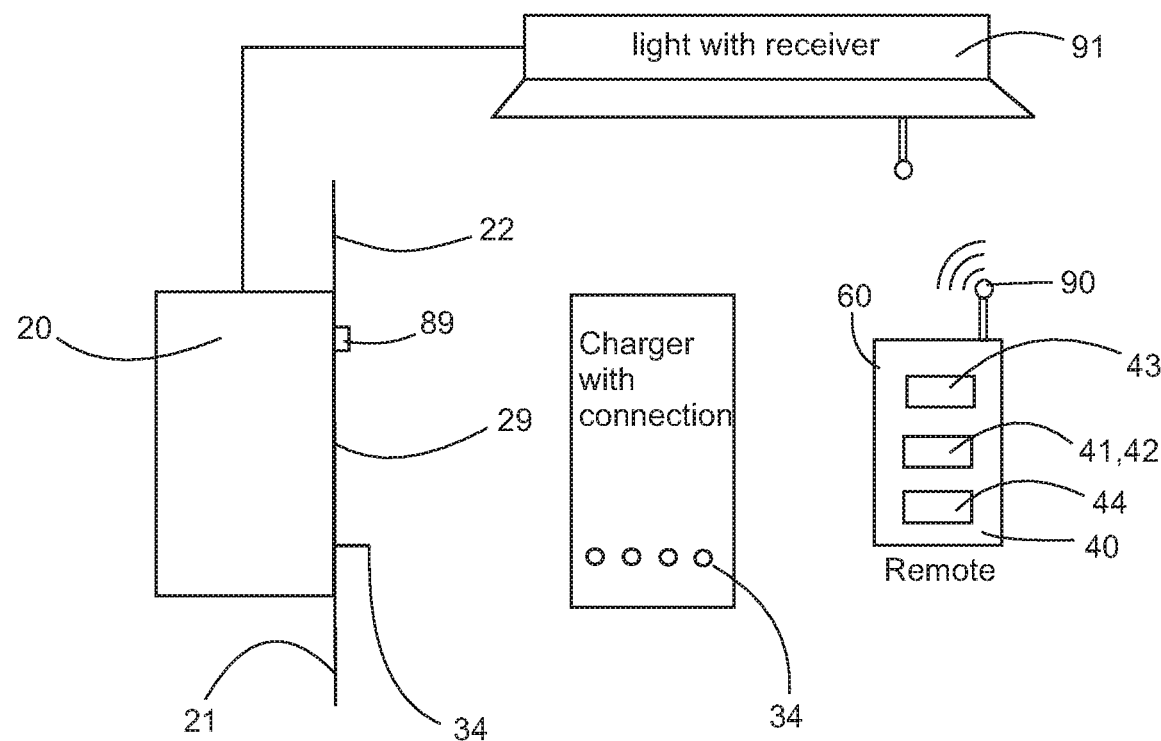
FIG. 3 is a diagram of the present invention.

The following call out list of elements can be a useful guide in referencing the element numbers of the drawings.
20 Switch Box
21 First Extension
22 Second Extension
23 Switch Box Body
24 Ground Wire
25 Ground Wire Connector
26 Ground Wire Extension
27 First Ground Tab Connector
28 Second Ground Tab Connector
29 Docking Area
30 Interface
31 Magnetic Latch
32 Interface Seal
33 Remote Control Pin Connector Base
34 Pin Connector Tip
35 Pin Connector Spring Assembly
36 Hot Wire
37 Neutral Wire
38 Wireless Charger
39 Remote Detection Sensor
40 Remote Control Faceplate
41 First Dimming Switch Button
42 Second Dimming Switch Button
43 On Button
44 Off Button
45 Wireless Transmitter
46 Indicator Light
47 Wireless Receiver
48 Peripheral Seat
49 Face Side
51 First Extension Mounting Opening
52 Second Extension Mounting Opening
53 Remote Control Faceplate Edge
54 Pin Connector Socket
55 First Data Contact
56 Second Data Contact
57 First Power Contact
58 Second Power Contact
59 Set Of Contacts
60 Battery
61 First Induction Loop
62 Second Induction Loop
65 First Data Pin Contact
66 Second Data Pin Contact
67 First Power Pin Contact
68 Second Power Pin Contact
70 Base Controls
71 Base First Dimming Switch Button
72 Base Second Dimming Switch Button
73 Base On Button
74 Base Off Button
81 First Pairing Switch Mounting Location
82 Second Pairing Switch Mounting Location
83 Third Pairing Switch Mounting Location
84 Leakage Current
85 Voltage Drain
86 First Charger Output
87 Second Charger Output
88 Electrical Switch
89 Pairing Switch
90 Remote Transmitter
91 Remote Receiver
92 Inclusive Charger Configuration

DETAILED DESCRIPTION OF THE PREFERRED EMBODIMENT

The present invention includes a switch box 20 having an electrical switch 88. The switch box 20 can be made of a plastic injection molded member that has a hollow portion for receiving electronics. The switch box 20 has a first extension 21 and a second extension 22. The pair of extensions are flanged and extend outwardly from the switch box body 23 of the switch box 20. The switch box 20 is preferably grounded. Additionally, trim plate is also preferably grounded. The trim plate is grounded at a ground wire connector 25. The ground wire connector 25 is grounded at the ground wire 24. Additionally, a ground wire extension 26 can be used for grounding to other locations such as a junction box. The ground wire 24 can ground the first ground tab connector 27 and the second ground tab connector 28 which are formed on the first extension 21 and the second extension 22. The ground tab connectors make an electrical connection to a trim plate if the trim plate is put over the switch box body 23. A variety of different decorative trim plates can be used. The switch box 20 is mounted to a junction box on a structure or building at a first extension mounting opening 51 and a second extension mounting opening 52. Preferably, screws or bolts or other types of connectors can connect through the first extension mounting opening 51 and the second extension mounting opening 52 for connection to a junction box.

The switch box body has a docking area 29. The remote control faceplate 40 docks at the docking area 29. The docking area is half of an interface 30. The interface 30 preferably includes a magnetic latch 31 which can be formed as four disc-shaped magnets mounted on the docking area 29 in depressions formed on a flat surface of the docking area 29. The magnets are preferably flat and flush to the docking area 29. The remote control faceplate 40 can have an underside that is ferrous so that it attracts and retains to the docking area 29. The docking area 89 provides a charging port. There can be more than one switch box body with the docking area 29 for each remote control faceplate 40. Multiple switch boxes 20 can be added for charging multiple remote control faceplate 40. Additionally, multiple power switches on the charger can be used for emergency or alternative light control.

An interface seal 32 can meet with a peripheral seat 48 to keep out dust and the like. The interface seal 32 can be made as an elastomeric gasket and the peripheral seat 48 can be made as a slight protrusion away from a flat underside surface of the remote control faceplate 40. The switch box body 23 also has a hotwire 36 and a neutral wire 37 for powering the switch box electronics from household alternating current.

The remote control faceplate 40 optionally has contacts that contact a portion of the switch box. A pin connector tip 34 can be telescopically mounted on a pin connector spring assembly 35. The pin connector tip 34 can be hollow for receiving a helical spring within the pin connector tip 34. The pin connector tip 34 is biased away from the pin connector spring assembly 35 by the helical spring mounted to the pin connector spring assembly 35. The pin connectors are mounted to the remote control pin connector base 33.

Figure 4:
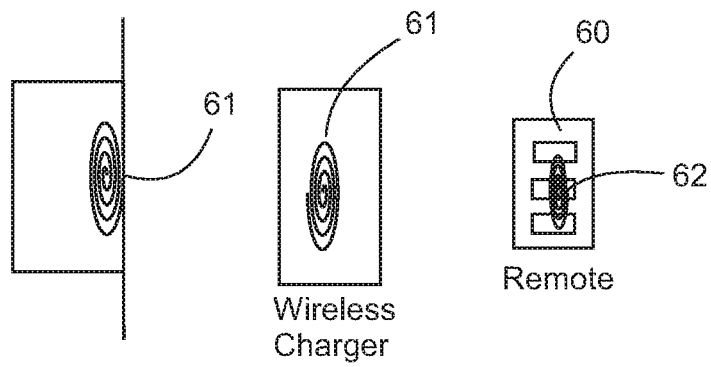
FIG. 4 is a diagram of the present invention.

Alternatively, as seen in FIG. 4, the battery 60 of the remote control can be charged by a wireless charger 38 which includes a first induction loop 61 mounted in the switch box body 23. The first induction loop 61 passes charging energy to a second induction loop 62 mounted in the remote control faceplate 40. The wireless charger 38 also includes the second induction loop 62. A sensor formed as a remote detection sensor 39 can be mounted on the docking area 29 and configured to activate the wireless charger 38 when the remote detection sensor 39 detects the remote control faceplate 40.

The remote control faceplate 40 has a first dimming switch button 41, a second dimming switch button 42, an on button 43 and an off button 44. The buttons activate various signals in a wireless transmitter 45 and can be made as capacitance or electrical contact switches. The wireless transmitter 45 can be configured to transmit in a variety of wireless means such as infrared, radio or otherwise. The remote control faceplate 40 preferably includes an indicator light 46 for indicating an activation of a button. A wireless receiver 47 can also be mounted in the remote control faceplate 40 so as to allow receiving of data from the switch box body 23. The buttons are mounted on a face side 49 of the remote control faceplate 40. The remote control faceplate 40 has a remote control faceplate edge 53 defining a thickness of the remote control faceplate 40.

The pin connector socket 54 is formed on the remote control faceplate 40 and is aligned so that the remote control faceplate 40 can receive electrical contact to the remote control pin connector base 33 of the docking area 29. A set of contacts 59 are formed on the pin connector socket 54 and may have four contacts for contacting four pins. The contacts may include a first data contact 55 which makes an electrical connection to a first data pin 65. A second data contact 56 can make an electrical connection to a second data pin 66. A first power contact 57 can make an electrical connection to a first power pin 67. A second power pin 68 can make an electrical contact to a second power contact 58.

Data and power can pass wirelessly between the remote control faceplate 40 and the switch box 20. Alternatively, or in conjunction, data and power can pass through electrical contacts between the remote control faceplate 40 in the switch box 20.

As seen in FIG. 1, the base controls 70 may include a base first dimming switch button 71, a base second dimming switch button 72, a base on button 73, and a base off button 74. The buttons can be formed as pushbuttons, or as capacitive sensing buttons. The buttons are flush with the charger base and also preferably flush with the wall in which the box is mounted.

The switch box 20 may have an original wall switch that can be replaced by the electrical switch 88. The electrical switch 88, can be powered by alternating current, or by leakage, or can be in line. Preferably, the electrical switch 88 is rectangular and has four magnets in each corner for retaining the remote in an oriented position. The cover will hold the remote in position and prevent accidental removal of the remote. The switch could be a pushbutton or a relay.

Figure 5:
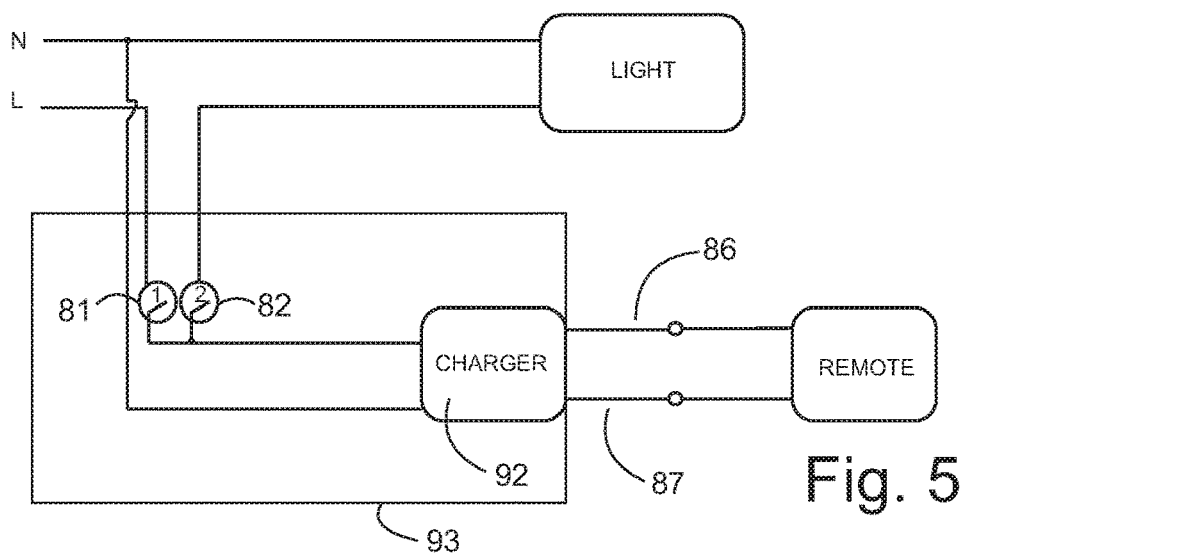
FIG. 5 is a diagram of a charge contact installation diagram.
Figure 6:
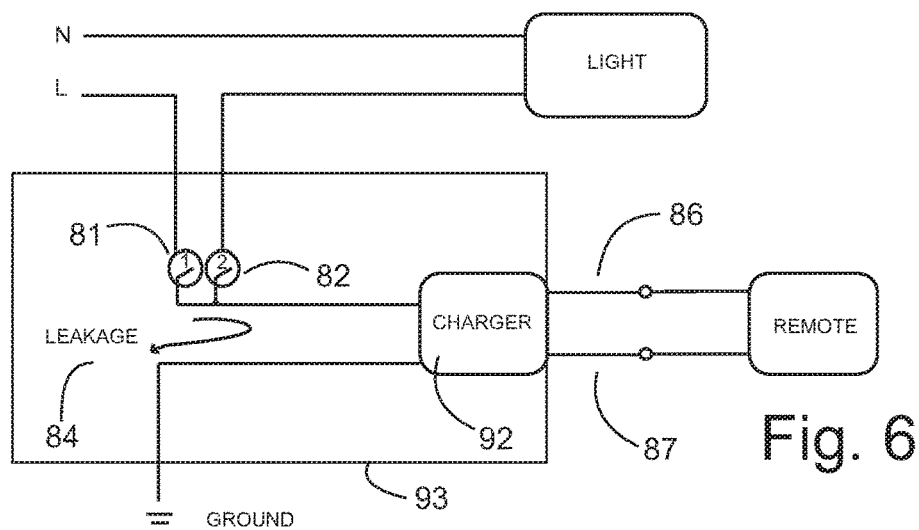
FIG. 6 is a diagram of a contact charge with leakage installation diagram.
Figure 7:
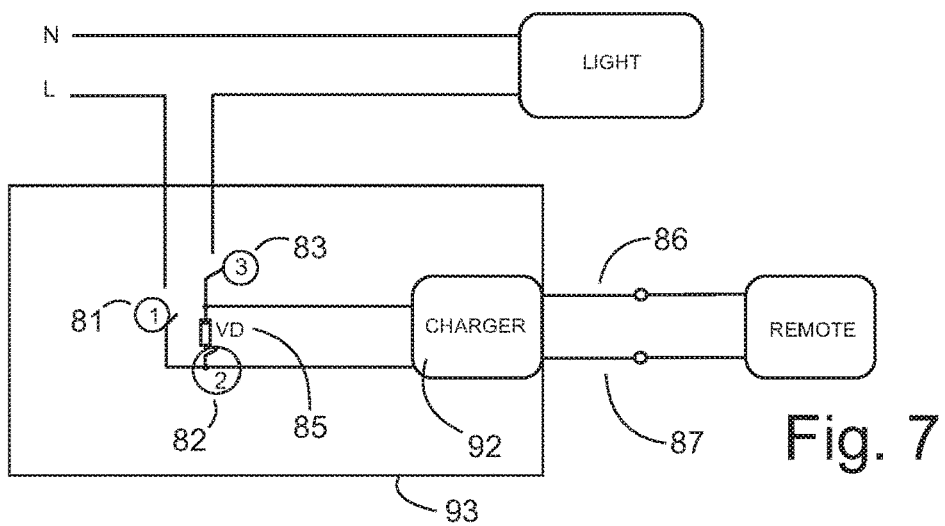
FIG. 7 is a diagram of a contact charge with voltage drop installation diagram.

As seen in FIG. 5, the pairing switch 89 can be mounted at a first pairing switch location 81, or a second pairing switch location 82. As seen in FIG. 6, the pairing switch 89 can be mounted at a first switch location or a second switch location, a leakage from the first switch location or the second switch location to ground can power the charger 92, 93. As seen in FIG. 7, the power can be in line where the switch can be at a first pairing switch location 81, a second pairing switch location 82, or a third pairing switch location 83. The VD can be any device that causes a voltage drop when the power is on. This voltage drop can be used to power the charger. The charger can be powered by a small voltage and current because the remote is a DC power remote.

A retainer such as a mechanical latch or magnetic latch can retain the remote control faceplate to the docking area formed on the switch box. The docking area on the switch box also preferably includes a pairing switch 89. The pairing switch 89 pairs the remote transmitter 90 of the remote control to the remote receiver 91. The remote receiver 91 are preferably mounted overhead with a light. The pairing switch 89 can be a pushbutton switch that turns off the electrical switch 88 and turns on the electrical switch 88. The pairing switch 89 because functions as an emergency control when other controls fail. The pairing switch 89 preferably pairs by the user pressing the pairing switch 89 the first time to turn off the electrical switch 88, and then pressing the pairing switch 89 a second time to turn on the electrical switch 88. When the electrical switch 88 is turned on, the receiver 91 will be listening for a pairing combination code from the remote. The pairing combination code can be a combination press of buttons such as by a combination of two of the buttons, namely a first dimming switch button 41, a second dimming switch button 42, an on button 43 and/or an off button 44. Alternatively, the pairing switch 89 can be the sole base control 70 so that an all in one other function button is provided for architectural simplicity and elegance.

As seen in FIGS. 5-7, and inclusive charger configuration 92 can be used which includes the first, second or third optional mounting locations for the switch, and related electrical configuration. In this case, the electrical switch 88 can be installed in the charger. The inclusive charger configuration 92 may have a larger size, which is in contrast to the low-profile charger 93 which is of a smaller size.

The charging can be switched between electrical contact and wireless inductive charging. The charging can be both electrical contact and wireless inductive charging during charging of the remote's battery.

The invention claimed is:

1. An integrated charger and remote control comprising:
a switch box having an electrical switch;
   a docking area formed on the switch box;
   a remote control faceplate, wherein the remote control has a wireless transmitter; control buttons formed on the remote control;
   a retainer retaining the remote control faceplate to the docking area, wherein the retainer has two modes, namely a retained mode when the remote control is retained to the docking area, and a released mode when the remote control faceplate is detached from the docking area, wherein when the remote control faceplate is off then on it automatically pairs with the switch box; and
   a battery located within the remote control, wherein the battery is charged by a charger formed in the docking area when the remote control is mounted on the docking area during the retained mode with either electrical contact or wireless inductive charging; and a pairing switch, wherein the pairing switch toggles the power of the electrical switch, wherein the docking area has base controls, wherein the base controls further include a base first dimming switch button.

2. The integrated charger and remote control of claim 1, wherein the remote control faceplate has a pin connector socket with a first data contact, a second data contact, a first power contact and a second power contact, wherein the docking area has a first data pin, a second data pin, a first power pin, and a second power pin.

3. The integrated charger and remote control of claim 1, wherein a remote control pin connector base protrudes from a surface of the docking area.

4. The integrated charger and remote control of claim 2, wherein the pin connector socket is recessed into the remote control faceplate.

5. The integrated charger and remote control of claim 1, wherein the battery is charged through contacts on the remote control faceplate.

6. The integrated charger and remote control of claim 1, wherein the battery is charged wirelessly through a pair of inductive loops.

7. The integrated charger and remote control of claim 1, wherein the base controls include a base off button.

8. The integrated charger and remote control of claim 1, wherein the base controls include a base on button.

9. The integrated charger and remote control of claim 1, wherein the base controls further include a base second dimming switch button.

10. The integrated charger and remote control of claim 9, wherein the base controls include a base off button, a base on button, base first dimming switch button, and a base second dimming switch button, wherein the base controls are covered by the remote control when the remote control is magnetically latched to the docking area.

11. The integrated charger and remote control of claim 10, wherein the remote control faceplate has a pin connector socket with a first data contact, a second data contact, a first power contact and a second power contact, wherein the docking area has a first data pin, a second data pin, a first power pin, and a second power pin.

12. The integrated charger and remote control of claim 10, wherein a remote control pin connector base protrudes from a surface of the docking area.

13. The integrated charger and remote control of claim 10, wherein the pin connector socket is recessed into the remote control faceplate.

14. The integrated charger and remote control of claim 1, wherein the pairing switch is configured to activate pairing when the pairing switch turns off, then turned on the electrical switch.

* * * * *